(12) United States Patent
Noguchi et al.

(10) Patent No.: US 7,501,459 B2
(45) Date of Patent: Mar. 10, 2009

(54) CARBON FIBER COMPOSITE MATERIAL AND METHOD OF PRODUCING THE SAME

(75) Inventors: Toru Noguchi, Ueda (JP); Akira Magario, Nagano-ken (JP)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 546 days.

(21) Appl. No.: 11/133,204

(22) Filed: May 20, 2005

(65) Prior Publication Data

US 2006/0079627 A1 Apr. 13, 2006

(30) Foreign Application Priority Data

May 21, 2004 (JP) ............................. 2004-151860

(51) Int. Cl.
C08J 3/20 (2006.01)
C08K 3/04 (2006.01)
C08L 9/00 (2006.01)

(52) U.S. Cl. ................... 523/346; 524/496; 524/574

(58) Field of Classification Search ................ 523/346
See application file for complete search history.

(56) References Cited

U.S. PATENT DOCUMENTS

| 5,744,235 A | * | 4/1998 | Creehan .................... 428/364 |
| 5,846,475 A | * | 12/1998 | Yano et al. .................. 264/444 |
| 6,001,917 A | * | 12/1999 | Takahashi et al. ........... 524/492 |
| 2004/0241440 A1 | | 12/2004 | Noguchi et al. | |

FOREIGN PATENT DOCUMENTS

| EP | 1 466 940 A1 | 10/2004 |
| JP | A 10-88256 | 4/1998 |
| WO | WO 91/01621 | 2/1991 |
| WO | WO 03/050181 A1 | 6/2003 |
| WO | WO 03/060002 A1 * | 7/2003 |

OTHER PUBLICATIONS

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).

Iwabuki et al., "Structure and Properties for Multi-walled Carbon Nanotube (MWNT)/EPDM Composites," May 10, 2004; 53d SPSJ Annual Meeting, pp. 930, (with English-language translation of relevant portions).

Magario et al., "CNT Peripheral Structure of CNT/Al Nanocomposites," Sep. 28, 2004; 135th Collected Abstracts of the 2004 Autumn Meeting of The Japan Institute of Metals, pp. 568, (with English-language translation of relevant portions).

* cited by examiner

Primary Examiner—Vasu Jagannathan
Assistant Examiner—Vickey Ronesi
(74) Attorney, Agent, or Firm—Oliff & Berridge, PLC (57) ABSTRACT

A method of producing a carbon fiber composite material includes: a first mixing step of mixing an elastomer and carbon nanofibers at a first temperature; and a second mixing step of mixing a mixture obtained by the first mixing step at a second temperature, and the first temperature is 50 to 100° C. lower than the second temperature.

9 Claims, 5 Drawing Sheets

PARTIAL ENLARGED VIEW

CARBON FIBER COMPOSITE MATERIAL AND METHOD OF PRODUCING THE SAME

Japanese Patent Application No. 2004-151860, filed on May 21, 2004, is hereby incorporated by reference in its entirety.

BACKGROUND OF THE INVENTION

The present invention relates to a carbon fiber composite material and a method of producing the same.

In recent years, a composite material using carbon nanofibers as disclosed in Japanese Patent Laid-Open No. 10-88256 has attracted attention. Such a composite material is expected to exhibit improved mechanical strength and the like due to inclusion of the carbon nanofibers. However, since the carbon nanofibers have strong aggregating properties, it is very difficult to uniformly disperse the carbon nanofibers in a matrix of a composite material. Therefore, it is difficult to obtain a carbon nanofiber composite material having desired properties. Moreover, expensive carbon nanofibers cannot be efficiently utilized.

SUMMARY

A first aspect of the invention relates to a method of producing a carbon fiber composite material, the method comprising:

a first mixing step of mixing an elastomer and carbon nanofibers at a first temperature; and a second mixing step of mixing a mixture obtained by the first mixing step at a second temperature, wherein the first temperature is 50 to 100° C. lower than the second temperature.

A second aspect of the invention relates to a carbon fiber composite material obtained by the above method.

DETAILED DESCRIPTION OF THE EMBODIMENT

The invention may provide a carbon fiber composite material in which carbon nanofibers are uniformly dispersed, and a method of producing the same.

An embodiment of the invention provides a method of producing a carbon fiber composite material, the method including:

a first mixing step of mixing an elastomer and carbon nanofibers at a first temperature; and a second mixing step of mixing a mixture obtained by the first mixing step at a second temperature, wherein the first temperature is 50 to 100° C. lower than the second temperature.

In this method of producing a carbon fiber composite material, the elastomer may have a molecular weight of 5,000 to 5,000,000. The elastomer may be a nonpolar elastomer. The nonpolar elastomer may be EPDM.

According to this method of producing a carbon fiber composite material, the carbon nanofibers can be uniformly dispersed in the elastomer by the two stages of mixing steps. The first mixing step causes the carbon nanofibers to be dispersed over the entire elastomer by applying a strong shear force by mixing the elastomer and the carbon nanofibers at a temperature lower than the temperature of the second mixing step. The carbon nanofibers dispersed by the first mixing step may be scattered over the elastomer as aggregates. In particular, when the elastomer is a nonpolar elastomer such as EPDM, the carbon nanofibers tend to be dispersed in the elastomer in a state in which a number of small carbon nanofiber aggregates exist. The second mixing step causes the elastomer molecules to be cut to produce radicals by mixing the elastomer and the carbon nanofibers at a temperature which is 50 to 100° C. higher than the temperature of the first mixing step. The aggregating force of the carbon nanofibers can be reduced by causing the radicals of the elastomer molecules and the carbon nanofibers to bond, whereby nano-level dispersibility can be increased. As a result, the carbon fiber composite material in one embodiment of the invention has a configuration in which the carbon nanofibers are uniformly dispersed in the elastomer as a matrix.

In this method of producing a carbon fiber composite material, the first temperature may be 0 to 50° C., and the second temperature may be 50 to 150° C.

With this method of producing a carbon fiber composite material, the carbon nanofibers may have an average diameter of 0.5 to 500 nm.

With this method of producing a carbon fiber composite material, the first mixing step may include mixing the elastomer and the carbon nanofibers together with carbon black.

The elastomer can be easily reinforced by the carbon black, which is less expensive than the carbon nanofibers, by mixing the elastomer and the carbon nanofibers together with the carbon black in the first mixing step. Moreover, the carbon nanofibers can be more uniformly dispersed by complicated flows of the elastomer occurring around the carbon black during the first and second mixing steps.

With this method of producing a carbon fiber composite material, the first mixing step may be performed by using an internal mixing method.

With this method of producing a carbon fiber composite material, the second mixing step may be performed by using an internal mixing method.

The use of the internal mixing method in the first and/or second mixing step enables mass production, and the temperature management in the mixing step can be accurately performed.

This method of producing a carbon fiber composite material may further include a third mixing step of mixing the carbon fiber composite material obtained by the second mixing step at a third temperature lower than the second temperature.

With this method of producing a carbon fiber composite material, the third mixing step may include performing tight milling a plurality of times by using an open roll with a rotor interval of 0.5 mm or less.

Embodiments of the invention are described below in detail with reference to the drawings.

(A) Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer easily enters the space between the aggregated carbon nanofibers to exhibit an improved effect of separating the carbon nanofibers. If the molecular weight of the elastomer is less than 5,000, since the elastomer molecules cannot be sufficiently entangled, the effect of dispersing the carbon nanofibers is reduced even if a shear force is applied in the subsequent step. If the molecular weight of the elastomer is greater than 5,000,000, since the elastomer becomes too hard, processing becomes difficult.

The carbon nanofiber generally has a structure in which the side surface is formed of a six-membered ring of carbon atoms and the end is closed by introduction of a five-membered ring. Since the carbon nanofiber has a forced structure, a defect tends to occur, whereby a radical or a functional group tends to be formed at the defect. Therefore, the elastomer and the carbon nanofiber can be bonded by using an elastomer having a high affinity (reactivity or polarity) to the radical of the carbon nanofiber. For example, the inventors of the invention have confirmed that the carbon nanofibers can be more uniformly dispersed in nitrile rubber (NBR) having a high polarity or in natural rubber (NR) containing a number of polar groups such as proteins. However, the inventors of the invention have also confirmed, by observation using an electron microscope, that, although the carbon nanofibers can be dispersed over the entire elastomer when using a nonpolar elastomer such as EPDM, many carbon nanofiber aggregates are scattered over the elastomer.

The nonpolar elastomers may be classified by the solubility parameter (SP value). As examples of the nonpolar elastomer, ethylene propylene rubber (EPDM, SP value: 16.0 to 17.8), styrene-butadiene rubber (SBR, SP value: 15.0 to 17.8), butyl rubber (IIR, SP value: 15.8 to 16.7), butadiene rubber (BR, SP value: 14.7 to 18.5), an olefin-based thermoplastic elastomer (TPO, SP value: 17.5), and the like can be given.

(B) Carbon Nanofiber

The carbon nanofibers preferably have an average diameter of 0.5 to 500 nm, and still more preferably 0.5 to 100 nm. The carbon nanofibers preferably have an average length of 0.01 to 1000 µm, and still more preferably 50 µm or less.

The amount of the carbon nanofibers added is not particularly limited, and may be set depending on the application. The carbon fiber composite material in this embodiment may be directly used as an elastomer material in the form of a crosslinked elastomer, an uncrosslinked elastomer, or a thermoplastic polymer, or may be used as a raw material for a metal or resin composite material. In the case of using the carbon fiber composite material in this embodiment as a raw material for a metal or resin composite material, the carbon fiber composite material may contain the carbon nanofibers in an amount of 0.01 to 50 wt %. Such a raw material for a metal or resin composite material may be used as a masterbatch as a carbon nanofiber source when mixing the carbon nanofibers into a metal or a resin.

As examples of the carbon nanofibers, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of a single-layer structure or a multi-layer structure, or a single-layer structure and a multi-layer structure may be present in combination. A carbon material having a partial carbon nanotube structure may also be used. The carbon nanotube may be called a graphite fibril nanotube.

A single-layer carbon nanotube or a multi-layer carbon nanotube is produced to a desired size using an arc discharge method, a laser ablation method, a vapor-phase growth method, or the like.

In the arc discharge method, an arc is discharged between electrode materials made of carbon rods in an argon or hydrogen atmosphere at a pressure lower than atmospheric pressure to some extent to obtain a multi-layer carbon nanotube deposited on the cathode. When mixing a catalyst such as nickel/cobalt into the carbon rod and discharging an arc, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples, a floating catalyst method, a zeolite-supported catalyst method, and the like can be given.

The carbon nanofibers may be provided with improved adhesion to and wettability with the elastomer by subjecting the carbon nanofibers to a surface treatment such as an ion-injection treatment, sputter-etching treatment, or plasma treatment before mixing the carbon nanofibers and the elastomer.

(C) Step of Dispersing Carbon Nanofibers in Elastomer

The step of dispersing the carbon nanofibers in the elastomer includes a first mixing step of mixing the elastomer and the carbon nanofibers at a first temperature, and a second mixing step of mixing the mixture obtained by the first mixing step at a second temperature.

In this embodiment, an example using an internal mixing method is described below as the first mixing step and the second mixing step.

Figure 1:
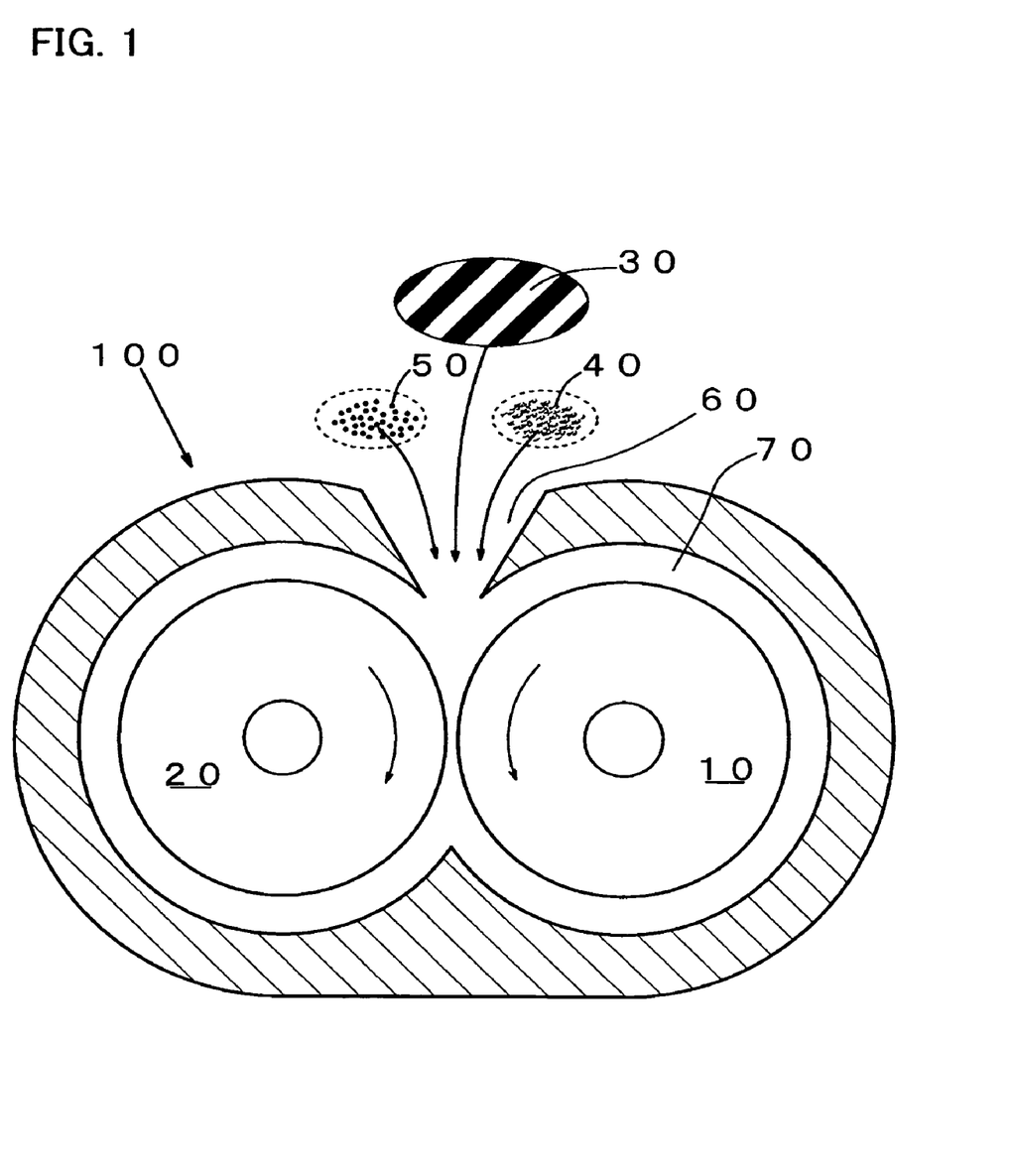
FIG. 1 schematically shows a mixing method for an elastomer and carbon nanofibers utilizing an internal mixing method used in one embodiment of the invention.
Figure 2:
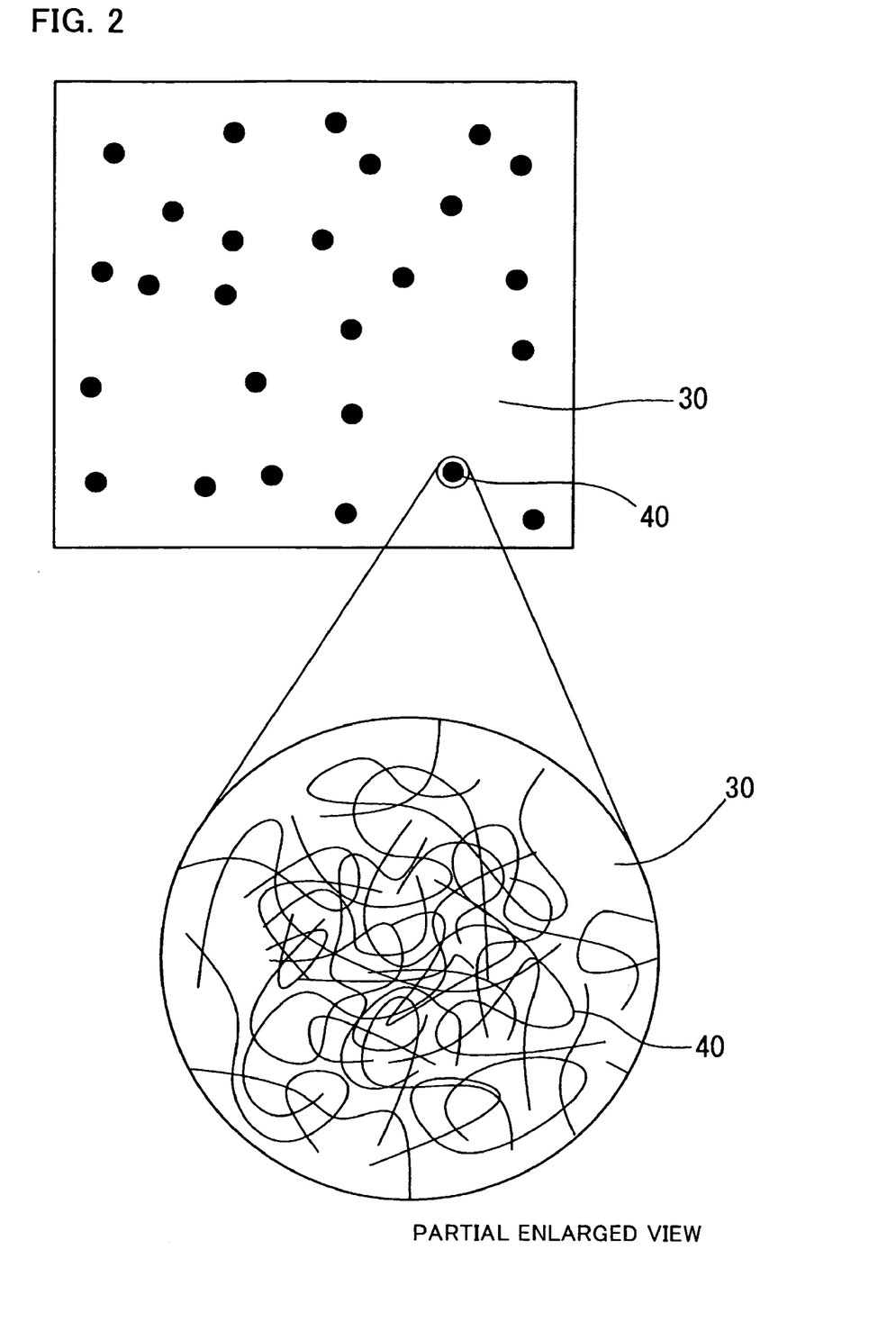
FIG. 2 is a schematic view of an optical microscope image of an elastomer after a first mixing step in one embodiment of the invention.
Figure 3:
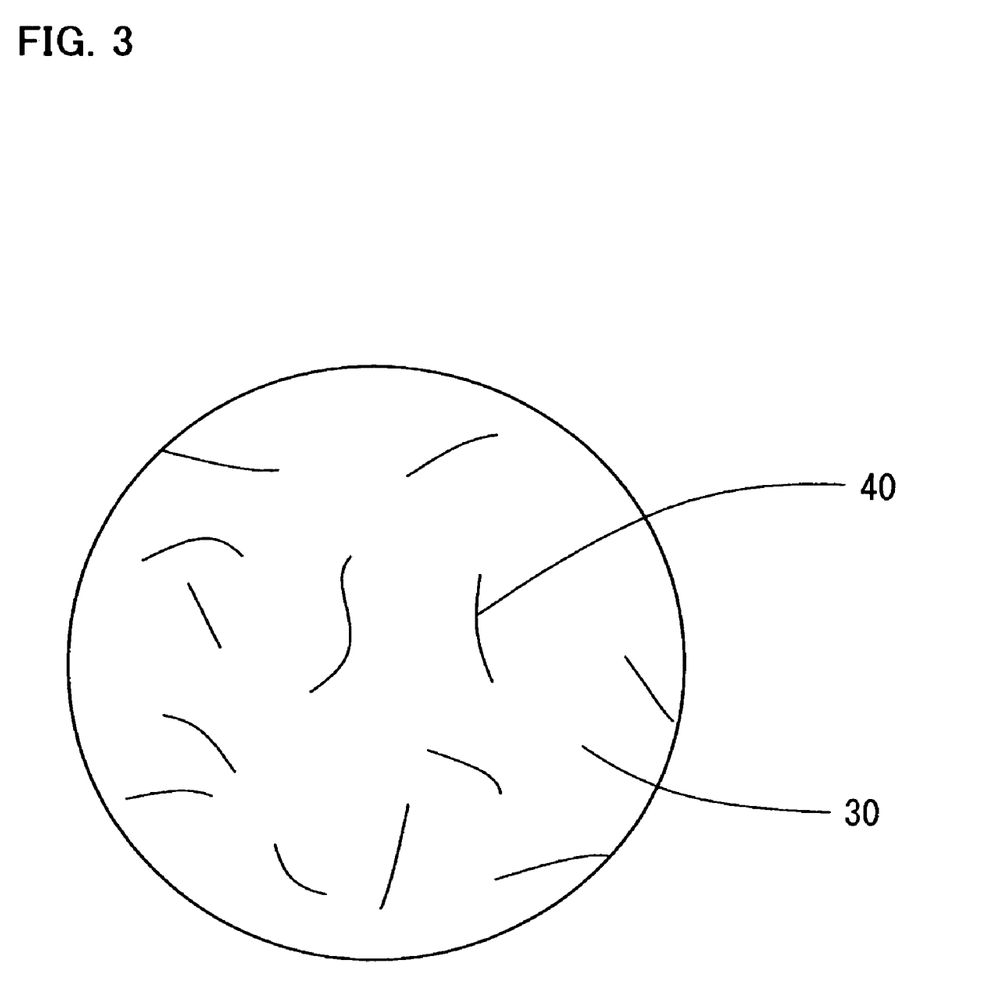
FIG. 3 is a schematic view of an electron microscope (SEM) image of the cross section of a carbon fiber composite material after a second mixing step in one embodiment of the invention.

FIG. 1 is a schematic view showing an internal mixer using two rotors. FIG. 2 is a schematic view of an optical microscope image of the elastomer after the first mixing step, in which the carbon nanofibers indicated by the black circle are partially magnified. FIG. 3 is a schematic view of an electron microscope image of the cross section of the carbon fiber composite material after the second mixing step.

In FIG. 1, an internal mixer 100 includes a first rotor 10 and a second rotor 20. The first rotor 10 and the second rotor 20 are disposed at a predetermined interval, and cause the elastomer to be mixed by means of rotation. In the example shown in FIG. 1, the first rotor 10 and the second rotor 20 are rotated in opposite directions (e.g. directions indicated by the arrows in FIG. 1) at a predetermined velocity ratio. A desired shear force can be obtained by adjusting the velocity of the first rotor 10 and the second rotor 20, the interval between the rotors 10 and 20 and the inner wall of a chamber 70, and the like. The shear force applied in this step is arbitrarily set depending on the type of the elastomer, the amount of the carbon nanofibers, and the like.

Pre-Mixing Step

An elastomer 30 is supplied to the internal mixer 100 through a material supply port 60, and the first and second rotors 10 and 20 are rotated. After the addition of carbon nanofibers 40 to the chamber 70, the first and second rotors 10 and 20 are further rotated to mix the elastomer 30 and the carbon nanofibers 40. A known compounding ingredient such as stearic acid may be added either simultaneously with or prior to the addition of the carbon nanofibers 40. This step is generally called breakdown, in which the temperature of the internal mixer is set at 20° C., for example.

In this pre-mixing step, another compounding ingredient such as carbon black 50 for reinforcement may be added either simultaneously with or prior to the addition of the carbon nanofibers 40 in an amount of 10 to 100 parts by weight (phr), for example. A complex flow of the elastomer 30 occurs around the carbon black 50 during mixing by adding the carbon black 50, whereby the carbon nanofibers 40 can be more uniformly dispersed. As the carbon black 50, it is preferable to use carbon black having a comparatively large average particle diameter of 40 to 500 nm. If the average particle diameter of the carbon black 50 is less than 40 nm, since the processability becomes poor, a decrease in durability (deterioration) may occur due to internal friction. If the average particle diameter of the carbon black 50 is greater than 500 nm, the effect of dispersing the carbon nanofibers may not be obtained during mixing.

First Mixing Step

The first mixing step of further mixing the mixture obtained by mixing the carbon nanofibers 40 and the carbon black 50 into the elastomer 30 is performed. The first and second rotors 10 and 20 are rotated at a predetermined velocity ratio. In the first mixing step, the elastomer and the carbon nanofibers are mixed at the first temperature which is 50 to 100° C. lower than the temperature in the second mixing step in order to obtain a shear force as high as possible. The first temperature is preferably 0 to 50° C., and still more preferably 5 to 30° C. If the first temperature is lower than 0° C., mixing becomes difficult. If the first temperature is higher than 50° C., since a high shear force cannot be obtained, the carbon nanofibers cannot be dispersed over the entire elastomer. The first temperature may be set by adjusting the temperature of the chamber 70 or the temperatures of the rotors 10 and 20. The velocity ratio and the temperatures may be controlled while measuring the temperature of the mixture. In the case of performing the first mixing step after the above-described mixing step using the same internal mixer, the internal mixer may be set at the first temperature in advance.

In the case of using nonpolar EPDM as the elastomer 30, the carbon nanofibers 40 are dispersed over the entire elastomer 30 by the first mixing step while forming aggregates (black circles shown in FIG. 2), as shown in the schematic view of the mixture in FIG. 2. The aggregate is formed of complexly entangled carbon nanofibers 40 as shown in the partial enlarged view in FIG 2. In FIGS. 2 and 3, the carbon black 50 is not shown in order to clearly illustrate the dispersion state of the carbon nanofibers 40.

Second Mixing Step

The mixture obtained by the first mixing step is supplied to another internal mixer 100 to perform the second mixing step. In the second mixing step, the mixture is mixed at the second temperature, which is 50 to 100° C. higher than the first temperature, in order to produce radicals by cutting the molecules of the elastomer 30. The temperature of the internal mixer used in the second mixing step is increased to the second temperature using a heater provided in the rotor or a heater provided in the chamber so that the second mixing step can be performed at the second temperature higher than the first temperature. The second temperature may be arbitrarily selected depending on the type of the elastomer used. The second temperature is preferably 50 to 150° C. If the second temperature is lower than 50° C., since radicals are produced in the elastomer molecules to only a small extent, the carbon nanofiber aggregates cannot be disentangled. If the second temperature is higher than 150° C., since the molecular weight of the elastomer is considerably decreased, the modulus of elasticity is decreased.

The period of time of the second mixing step may be arbitrarily set depending on the second temperature, the rotor interval, the rotational velocity, and the like. In this embodiment, effects can be obtained by mixing for about 10 minutes or more.

Radicals are produced by cutting the molecules of the elastomer 30 by performing the second mixing step, and the aggregated carbon nanofibers 40 are separated so that the carbon nanofibers are removed one by one by the elastomer molecules, whereby a carbon fiber composite material in which the carbon nanofibers 40 are uniformly dispersed in the elastomer 30 at a nano level, as shown in FIG. 3, is obtained. Since the dispersed carbon nanofibers 40 are prevented from reaggregating due to bonding with the radicals of the elastomer molecule, excellent dispersion stability is obtained.

Third Mixing Step

The carbon fiber composite material obtained by the second mixing step is supplied to an open roll set at the first temperature, and a third mixing step (tight milling step) is performed a plurality of times, such as 10 times, to perform sheet forming. The third mixing step may be performed as required. The roll interval (nip) is set at 0.5 mm or less, such as 0.3 mm, at which the shear force becomes higher than the shear force in the first and second mixing steps. The roll temperature is set at a third temperature of 0 to 50° C., and still more preferably 5 to 30° C. in the same manner as in the first mixing step. The third mixing step is a final dispersion step for further uniformly dispersing the carbon nanofibers 40 in the elastomer 30, and is effective when more uniform dispersibility is required. The elastomer 30 in which the radicals are produced functions to remove the carbon nanofibers 40 one by one by performing the third mixing step (tight milling step), whereby the carbon nanofibers 40 can be further dispersed. In addition, a crosslinking agent may be added in the third mixing step to uniformly disperse the crosslinking agent.

As described above, the carbon nanofibers can be dispersed over the entire elastomer by applying a high shear force by performing the first mixing step at the first temperature, and the carbon nanofiber aggregates can be disentangled by the radicals of the elastomer molecules by performing the second mixing step at the second temperature. Therefore, the carbon nanofibers can be dispersed over the entire nonpolar elastomer such as EPDM, and a carbon fiber composite material in which the carbon nanofiber aggregates do not exist can be produced.

In the first and second mixing steps for dispersing the carbon nanofibers in the elastomer by applying a shear force, it is preferable to use an internal mixer from the viewpoint of processability. As the internal mixer, a tangential or intermeshing mixer such as a Banbbury mixer, a kneader, or a Brabender may be employed. The first, second, and third mixing steps may be performed using a multi-screw extrusion mixing method (twin-screw extruder) instead of the above-described internal mixing method and the open-roll method. The mixer may be appropriately selected in combination depending on the amount of production and the like.

After the first and second mixing steps for dispersing the carbon nanofibers in the elastomer to mix the carbon nanofibers and the elastomer and the third mixing step which is optionally performed, an extrusion step, a molding step, a crosslinking step, and the like may be performed using a known method.

In the first, second, and third mixing steps for mixing the elastomer and the carbon nanofiberors or in the preceding or subsequent step, a compounding ingredient usually used in the processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given. In particular, the elastomer can be easily reinforced by inexpensive carbon black by adding and mixing the carbon black. Moreover, the carbon nanofibers can be more uniformly dispersed by complicated flows around the carbon black during the first, second, and third mixing steps.

(D) Carbon Fiber Composite Material Obtained by Above-Described Method

In the carbon fiber composite material in this embodiment, the carbon nanofibers are uniformly dispersed in the elastomer as the matrix. The dispersion state of the carbon nanofibers may be evaluated by the values of tensile strength (TB), elongation at break (EB), and 100% tensile stress (M100) of the crosslinked carbon fiber composite material.

The tensile strength (TB) and the tensile stress (rigidity) (M100) are generally improved by using the carbon nanofibers as the reinforcing material. Moreover, the tensile strength (TB) and the tensile stress (M100) can be further improved by improving the dispersion state of the carbon nanofibers in the carbon fiber composite material as described in this embodiment. In particular, since the carbon nanofibers are dispersed over the entire elastomer by mixing the elastomer and the carbon nanofibers at a comparatively low first temperature, the tensile strength (TB) and the elongation at break (EB) are improved. However, since the carbon nanofiber aggregates exist, the periphery of the aggregate functions as a fracture starting point, whereby the tensile stress (M100) is not improved to a large extent. However, the carbon nanofiber aggregates are disentangled by mixing the elastomer and the carbon nanofibers at the second temperature (e.g. 50 to 150° C.) which is higher than the first temperature, whereby the tensile stress (M100) is improved.

Therefore, the carbon fiber composite material in this embodiment is a material of which the values of the tensile strength (TB), elongation at break (EB), and tensile stress (M100) are improved and well-balanced. In the carbon fiber composite material in this embodiment, the carbon nanofibers are uniformly dispersed without aggregating, since the values of the tensile strength (TB), elongation at break (EB), and tensile stress (M100) are improved and well-balanced.

The carbon fiber composite material in this embodiment may be used as an elastomer material or a raw material for a metal or resin composite material or the like, as described above. The carbon nanofibers are generally entangled and dispersed in a medium to only a small extent. However, when using the carbon fiber composite material in this embodiment as a raw material for a metal or resin composite material, since the carbon nanofibers exist in the elastomer in a dispersed state, the carbon nanofibers can be easily dispersed in a medium by mixing the raw material with a medium such as a metal or a resin.

Examples of the invention and comparative examples are described below. However, the invention is not limited to the following examples.

EXAMPLES 1 TO 3 AND COMPARATIVE EXAMPLES 1 TO 4

(1) Preparation of Samples of Examples 1 to 3

An elastomer shown in Table 1 and a predetermined amount of carbon nanofibers were mixed using an internal mixing method to prepare samples.

(a) A Brabender (chamber temperature: 20° C.) as an internal mixer was charged with a predetermined amount (100 g) of an elastomer (100 parts by weight (phr)) shown in Table 1. As the elastomer, EPDM (EP22) manufactured by JSR Corporation was used.

(b) Carbon nanofibers were added to the elastomer in an amount shown in Table 1 (10 parts by weight (phr)). 1 part by weight (phr) of stearic acid was also added to the elastomer. In Example 3 and Comparative Example 4, 60 parts by weight (phr) of carbon black was added before adding the carbon nanofibers. As the carbon nanofibers, carbon nanofibers with an average diameter of 13 nm manufactured by ILJIN was used. As the carbon black, SRF carbon black with an average particle diameter of 66 nm was used.

(c) After the addition of the carbon nanofibers, the mixture of the elastomer and the carbon nanofibers was subjected to a mixing (breakdown) step, and removed from the rotors.

(d) The mixture obtained by (c) was placed between the rotors of the internal mixer set at a temperature of 20° C., subjected to a first mixing step for a mixing time shown in Table 1, and removed from the rotors.

(e) The mixture obtained by (d) was placed in an internal mixer set at a second temperature shown in Table 1, subjected to a second mixing step for a mixing time shown in Table 1, and removed from the internal mixer.

(f) The mixture obtained by (e) was supplied to six-inch an open roll with a narrow roll interval (nip) of 0.3 mm and a roll temperature of 20° C., and tight-milled ten times (third mixing step). The tight milling was repeatedly performed ten times. In the tight milling step, 2 parts by weight (phr) of a peroxide was added as a crosslinking agent. The tight-milled mixture was rolled to a thickness of 1.1 mm and removed.

(g) The sample cut into a die size was placed in a die and subjected to press-crosslinking at 175° C. and 100 kgf/cm$^2$ for 20 minutes to obtain a crosslinked sheet with a thickness of about 1.0 mm.

The samples of Examples 1 to 3 were thus obtained.

As Comparative Example 1, a sample was formed using only EPDM. In Comparative Example 2, a sample was obtained without performing the first and second mixing steps (steps (d) and (e)). In Comparative Examples 3 and 4, the samples were obtained without performing the second mixing step (step (e)).

(2) Measurement of Tensile Strength (TB), Elongation at Break (EB), and Tensile Stress (M100)

The TB, EB, and M100 of the samples of Examples 1 and 2 and Comparative Examples 1 to 3 were measured in accordance with JIS K 6521-1993. The measurement results are shown in Table 1.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Type of elastomer |  | EPDM | EPDM | EPDM | EPDM | EPDM | EPDM | EPDM |
| Mixing ratio | Elastomer (phr) | 100 | 100 | 100 | 100 | 100 | 100 | 100 |
|  | Carbon nanofibers (phr) | 10 | 10 | 10 | 0 | 10 | 10 | 10 |
|  | SRF carbon black (phr) | 0 | 0 | 60 | 0 | 0 | 0 | 60 |
| Firtst kneading step | First temperature (° C.) | 20 | 20 | 20 | — | — | 20 | 20 |
|  | Time (min) | 10 | 10 | 10 | — | — | 10 | 10 |
| Second kneading step | Second temperature (° C.) | 60 | 100 | 100 | — | — | — | — |
|  | Time (min) | 10 | 10 | 10 | — | — | — | — |
| Third kneading step | Third temperature (° C.) | 20 | 20 | 20 | — | 20 | 20 | 20 |
|  | Tight milling (times) | 10 | 10 | 10 | — | 10 | 10 | 10 |
| TB (Mpa) |  | 9.5 | 9.6 | 27.2 | 1.5 | 5.1 | 6.9 | 19.4 |
| EB (%) |  | 125 | 145 | 135 | 175 | 135 | 170 | 120 |
| M100 (Mpa) |  | 6.6 | 7.4 | 24.3 | 1.1 | 3.9 | 3.5 | 15.1 |

From the results shown in Table 1, the following items were confirmed according to Examples 1 to 2 of the invention. Specifically, the carbon fiber composite material containing the carbon nanofibers has higher TB and M100 values in comparison with the EPDM which does not contain the carbon nanofibers. The TB value of the carbon fiber composite material of the invention is higher than those of Comparative Examples 2 and 3. The M100 value of the carbon fiber composite material of the invention is higher than those of Comparative Examples 2 and 3. These results suggest that the carbon nanofibers are uniformly dispersed over the entire carbon fiber composite material according to the example and that the number of carbon nanofiber aggregates is small. According to the example of the invention, it was confirmed that the tensile strength (TB) and the tensile stress (M100) are improved while maintaining the elongation at break (EB) due to inclusion of the carbon nanofibers uniformly dispersed in the matrix, so that the reinforcing effect due to the carbon nanofibers is obtained. The TB, EB, and M100 are also improved when mixing the carbon black as in Comparative Example 4. However, the TB and M100 are improved in a well-balanced manner in Example 3 while maintaining the EB.

Figure 4:
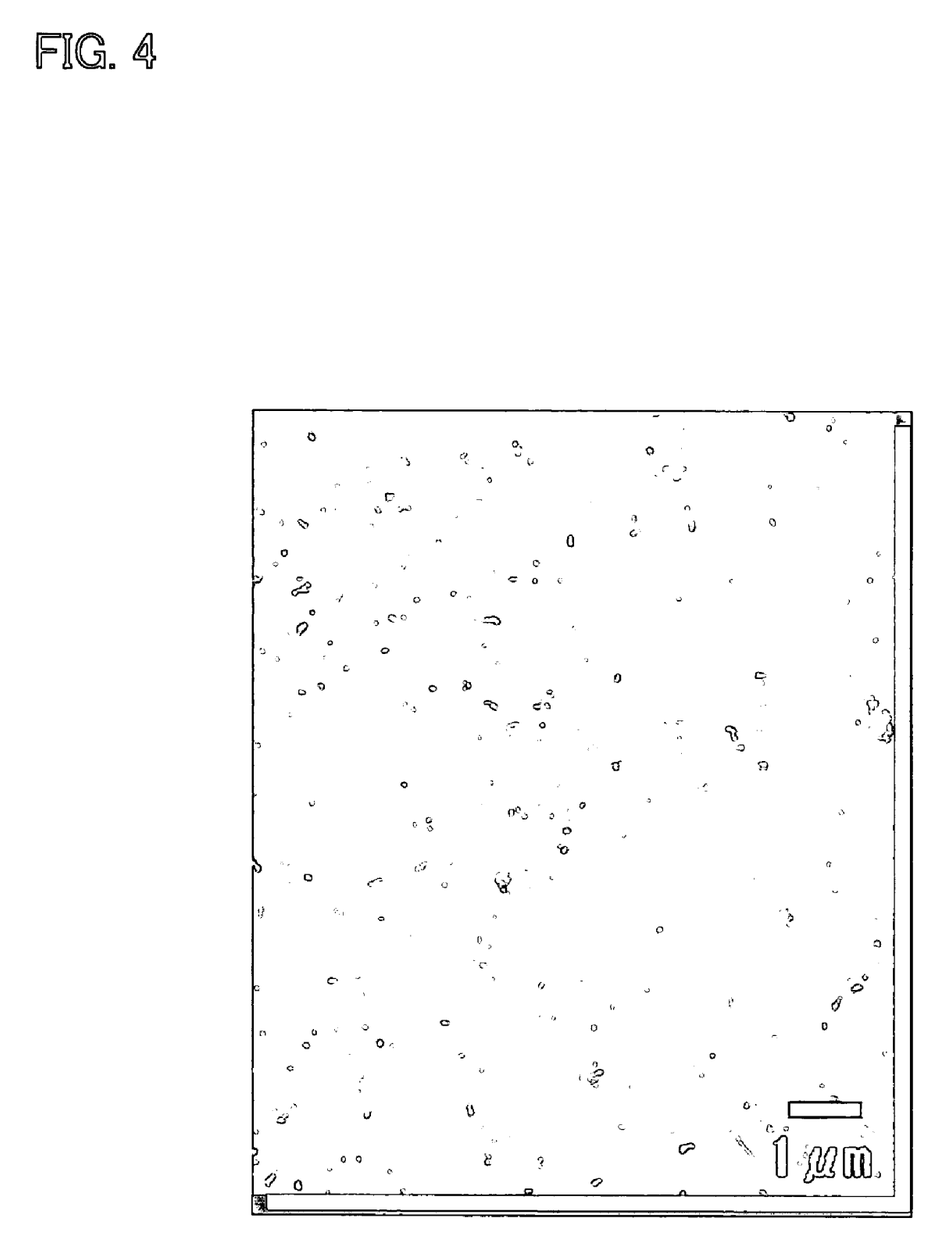
FIG. 4 shows an SEM image of a composite material obtained in Example 2.

A scanning electron microscope (SEM) image was taken for the sample of the carbon fiber composite material obtained in Example 2. FIG. 4 shows the resulting SEM image. The photographing conditions were set at an acceleration voltage of 3.0 kV and a magnification of 10.0 k. From the SEM image shown in FIG. 4, it was confirmed that the carbon nanofibers are separated and uniformly dispersed in the EPDM. In FIG. 4, white linear sections indicate the carbon nanofibers.

Figure 5:
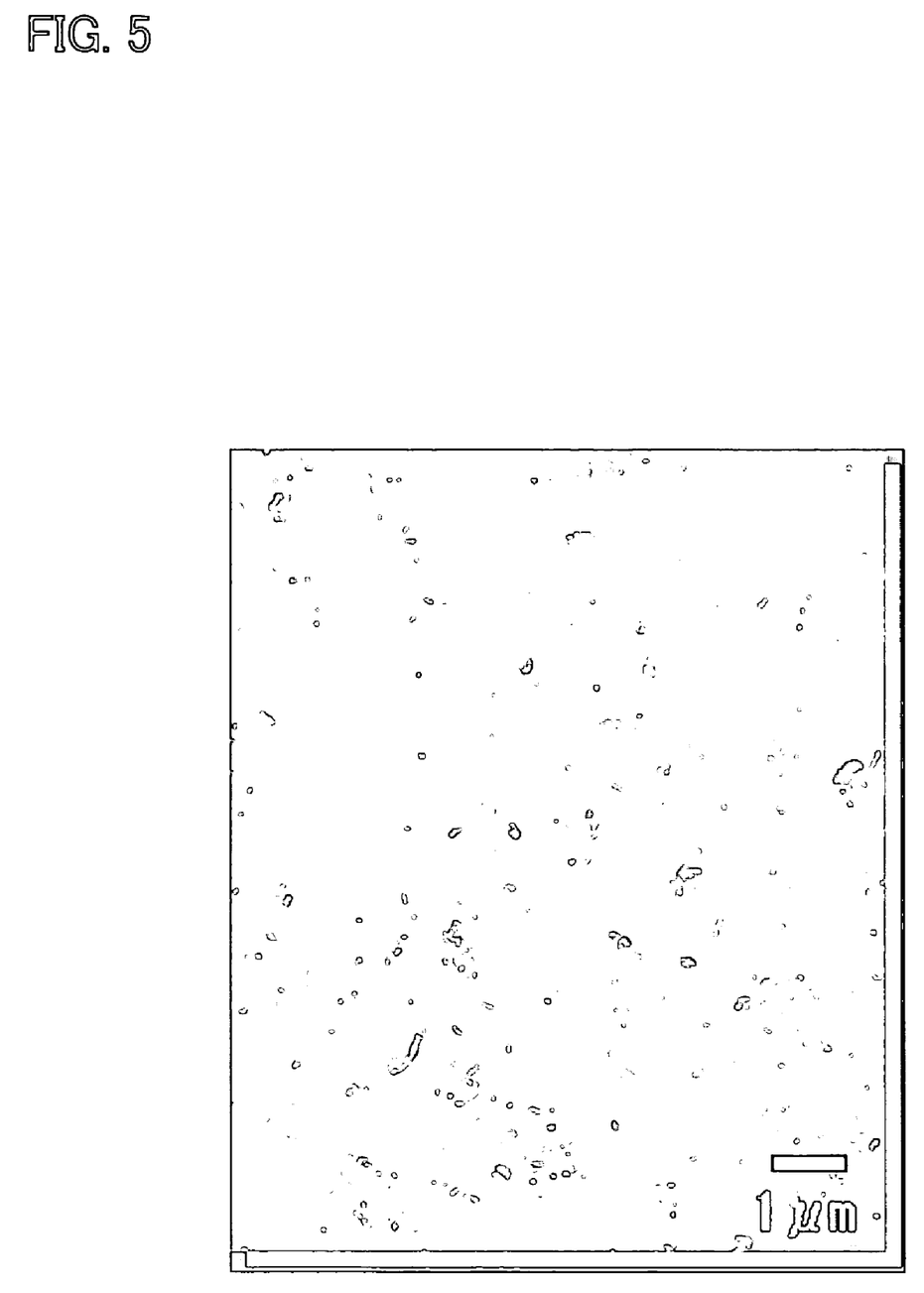
FIG. 5 shows an SEM image of a composite material obtained in Comparative Example 3.

As a reference, FIG. 5 shows an SEM image of the sample of Comparative Example 3. The SEM photographing conditions were set at an acceleration voltage of 3.0 kV and a magnification of 10.0 k. As shown in the SEM image in FIG. 5, although the carbon nanofibers are dispersed over the entire material, a number of small entangled aggregates are scattered over the material.

As described above, according to the invention, it was confirmed that the carbon nanofibers, which can be generally dispersed in a matrix to only a small extent, are uniformly dispersed in the elastomer, particularly in a nonpolar elastomer such as EPDM.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method of producing a carbon fiber composite material, the method comprising:
   a first mixing step of mixing an elastomer and carbon nanofibers at a first temperature;
   a second mixing step of mixing a mixture obtained by the first mixing step at a second temperature, and
   a third mixing step of mixing the carbon fiber composite material obtained by the second mixing step at a third temperature;
   wherein:
      the first temperature is 50 to 100° C. lower than the second temperature;
      the third temperature is lower than the second temperature; and
      the third mixing step comprises performing tight milling a plurality of times by using an open roll with a rotor interval of 0.5 mm or less.

2. The method of producing a carbon fiber composite material as defined in claim 1, wherein the elastomer has a molecular weight of 5,000 to 5,000,000.

3. The method of producing a carbon fiber composite material as defined in claim 1, wherein the elastomer is a nonpolar elastomer.

4. The method of producing a carbon fiber composite material as defined in claim 1, wherein the elastomer is EPDM.

5. The method of producing a carbon fiber composite material as defined in claim 1,
   wherein the first temperature is 0 to 50° C., and
   wherein the second temperature is 50 to 150° C.

6. The method of producing a carbon fiber composite material as defined in claim 1, wherein the carbon nanofibers have an average diameter of 0.5 to 500 nm.

7. The method of producing a carbon fiber composite material as defined in claim 1,
   wherein the first mixing step includes mixing the elastomer and the carbon nanofibers together with carbon black.

8. The method of producing a carbon fiber composite material as defined in claim 1, wherein the first mixing step is performed by using an internal mixing method.

9. The method of producing a carbon fiber composite material as defined in claim 1, wherein the second mixing step is performed by using an internal mixing method.

* * * * *